United States Patent
Saylor et al.

(10) Patent No.: US 9,444,805 B1
(45) Date of Patent: Sep. 13, 2016

(54) CONTEXT-AWARE VALIDATION

(71) Applicant: MicroStrategy Incorporated, Vienna, VA (US)

(72) Inventors: Michael J. Saylor, Vienna, VA (US); Peng Xiao, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 14/603,429

(22) Filed: Jan. 23, 2015

Related U.S. Application Data

(60) Provisional application No. 61/931,931, filed on Jan. 27, 2014.

(51) Int. Cl.
*H04L 9/32* (2006.01)
*H04L 29/06* (2006.01)

(52) U.S. Cl.
CPC .................................. *H04L 63/08* (2013.01)

(58) Field of Classification Search
CPC .......................... G06Q 30/0282; G06Q 50/22
USPC ........... 713/156, 173, 193; 726/2, 5, 6, 7, 12
See application file for complete search history.

(56) References Cited

U.S. PATENT DOCUMENTS

| | | | |
|---|---|---|---|
| 8,763,078 B1* | 6/2014 | Castellucci | H04L 63/1441 726/1 |
| 2004/0243430 A1* | 12/2004 | Horstemeyer | B60R 25/102 340/928 |
| 2010/0306835 A1* | 12/2010 | Coan | H04L 63/08 726/7 |
| 2011/0252464 A1* | 10/2011 | Sanjeev | H04L 63/107 726/7 |
| 2012/0204235 A1* | 8/2012 | Jaudon | G06F 21/604 726/4 |

OTHER PUBLICATIONS

"AWS Security Token Service: Using Temporary Security Credentials"—Amazon Jun. 15, 2011 http://docs.aws.amazon.com/STS/latest/UsingSTS/sts-ug.pdf.*

* cited by examiner

*Primary Examiner* — Randy Scott
(74) *Attorney, Agent, or Firm* — Fish & Richardson P.C.

(57) ABSTRACT

An application executed on a client device displays a user interface that receives input related to outputting credential information, wherein the application is configured to manage credentials that are associated with a validation system. The application receives, through the user interface, first user input to output a representation of a first credential in a manner that enables a credential authority to validate the representation. In response to receiving the first user input, the application identifies a location of the client device. The application determines whether the location of the client device is associated with a first region where the first credential is enabled for validation. In response to determining that the location of the client device is associated with the first region where the first credential is enabled for validation, the application displays, on the user interface, the representation of the first credential.

22 Claims, 5 Drawing Sheets

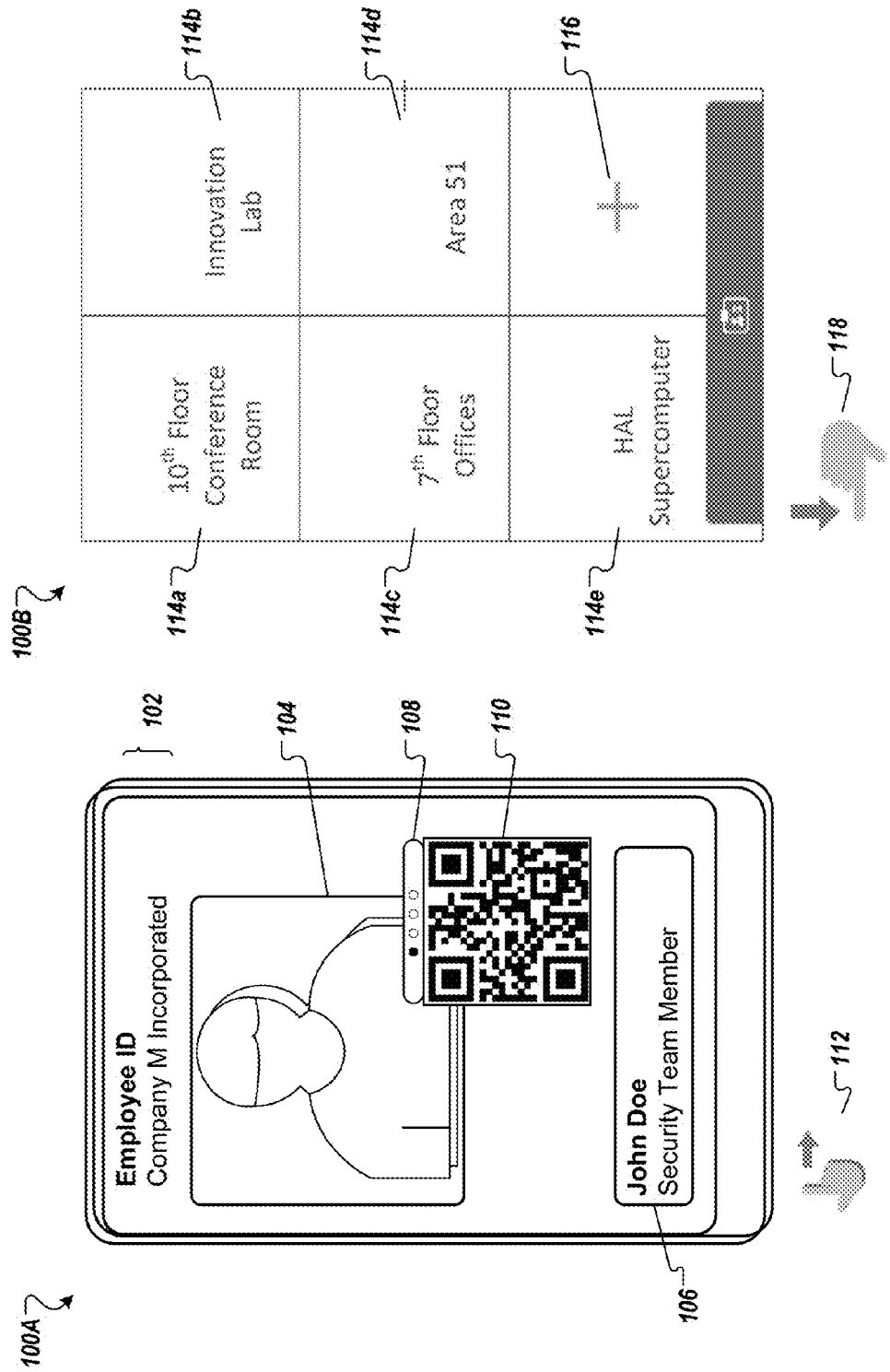

CONTEXT-AWARE VALIDATION

CROSS-REFERENCE TO RELATED APPLICATION

This application claims priority from U.S. Provisional Application No. 61/931,931, filed Jan. 27, 2014, and titled "Context-Aware Validation," which is incorporated by reference.

TECHNICAL FIELD

This specification generally relates to providing context-aware validation of user credentials.

BACKGROUND

A user may be associated with an electronic credential that, for example, permits the user to access certain resources or to be identified to others. The credential may be stored in an electronic device associated with the user.

SUMMARY

In one aspect, a computer program product implemented in a non-transitory computer-readable medium stores instructions that are executable by one or more processors. Upon such execution, the instructions cause the one or more processors to perform the following operations.

An application executed on a client device presents, on a display coupled to the client device, a user interface that receives input related to outputting credential information, wherein the application is configured to manage credentials that are associated with a validation system. The application receives, through the user interface, first user input to output a representation of a first credential in a manner that enables a credential authority to validate the representation. In response to receiving the first user input, the application identifies a location of the client device. Based on identifying the location of the client device, the application determines whether the location of the client device is associated with a first region where the first credential is enabled for validation. In response to determining that the location of the client device is associated with the first region where the first credential is enabled for validation, the application displays, on the user interface, the representation of the first credential.

Particular implementations may include one or more of the following features. Determining whether the location of the client device is associated with the first region where the first credential is enabled for validation may include transmitting, by the application and over a network connection through the client device, information corresponding to the location of the client device to a remote server associated with the validation system. The application may receive, over the network connection through the client device, information from the remote server indicating the first region where the first credential is enabled for validation. The application may determine whether the location of the client device is within the first region indicated by the information received from the remote server.

Determining whether the location of the client device is within the first region indicated by the information received from the remote server may comprise identifying, by the application and based on the information received from the remote server, a reference location associated with the first region. The application may determine whether the location of the client device is within a predefined distance of the reference location.

Determining whether the location of the client device is associated with the first region where the first credential is enabled for validation may include accessing, by the application, information that defines the first region and that is stored at the client device. The application may determine whether the location of the client device is within the first region based on the information that defines the first region and that is stored at the client device.

Accessing the information that defines the first region and that is stored at the client device may include determining, by the application, that a remote server associated with the validation system is inaccessible over a network connection through the client device, wherein the remote server is configured to provide updated information indicating the first region where the first credential is enabled for validation. In response to determining that the remote server is inaccessible, the application may access the information stored at the client device.

The instructions may cause the one or more processors to perform the following operations. The application may start a counter based on displaying the representation of the first credential on the user interface. Based on the counter reaching a particular value, the application may identify an updated location of the client device. Based on the updated location of the client device, the application may determine that the updated location of the client device is not associated with the first region where the first credential is enabled for validation. In response to determining that the updated location of the client device is outside the first region where the first credential is enabled for validation, the application may present, on the user interface, information indicating that the first credential is restricted at the updated location of the client device.

Presenting the information indicating that the first credential is restricted at the updated location of the client device may comprise displaying, by the application and on the user interface, a notification that provides information descriptive of the first region where the credential is enabled for validation.

Presenting the information indicating that the first credential is restricted at the updated location of the client device may comprise obscuring, by the application, the representation of the first credential that is displayed on the user interface. The application may present, as an overlay on the obscured representation of the first credential, information indicating that the first credential is restricted at the updated location of the client device.

The instructions may cause the one or more processors to perform the following operations. The application may receive, through the user interface displaying the obscured representation of the first credential, second user input to provide further information. In response to receiving the second user input, the application may display, on the user interface, a notification that provides information descriptive of the first region where the credential is enabled for validation.

The application may revoke the first credential based on determining that the updated location of the client device is not associated with the first region where the first credential is enabled for validation. Revoking the first credential may comprise disabling the first credential from future validation.

The application may receive, through the user interface, second user input to output a new representation of the first credential in a manner that enables a credential authority to validate the new representation of the first credential. In response to receiving the second user input, the application may identify an updated location of the client device. Based on the updated location of the client device, the application may determine whether the updated location of the client device is associated with a second region where the first credential is enabled for validation. In response to determining that the updated location of the client device is not associated with the second region where the first credential is enabled for validation, the application may present, on the user interface, information indicating that the first credential is not enabled for validation at the updated location of the client device.

The application may receive, through the user interface, second user input to output a new representation of the first credential in a manner that enables a credential authority to validate the representation of the second credential. In response to receiving the second user input, the application may identify a time at the client device. Based on the time at the client device, the application may determine whether the time at the client device is within a predefined time period during which the first credential is enabled for validation. In response to determining that the time at the client device is outside the predefined time period during which the first credential is enabled for validation, the application may present, on the user interface, information indicating that the first credential is restricted.

The application may receive, through the user interface, second user input to output a representation of a second credential in a manner that enables a credential authority to validate the representation of the second credential. In response to receiving the second user input, the application may identify an updated location of the client device. Based on the updated location of the client device, the application may determine whether the updated location of the client device is associated with a second region where the second credential is enabled for validation. In response to determining that the updated location of the client device is not associated with the second region where the second credential is enabled for validation, the application may present, on the user interface, information indicating that the second credential is not enabled for validation at the updated location of the client device.

The application may receive, through the user interface, second user input to output a representation of a second credential in a manner that enables a credential authority to validate the representation of the second credential. In response to receiving the second user input, the application may identify a time at the client device. Based on the time at the client device, the application may determine whether the time at the client device is within a predefined time period during which the second credential is enabled for validation. In response to determining that the time at the client device is outside the predefined time period during which the second credential is enabled for validation, the application may present, on the user interface, information indicating that the second credential is restricted.

Presenting the information indicating that the second credential is restricted may comprise displaying, by the application and on the user interface, a notification that provides information descriptive of the predefined time period during which the credential is enabled for validation.

Presenting the user interface on the display coupled to the client device may comprise presenting, by the application, information about a group of credentials that are associated with a user account that is logged into the application executed on the client device.

Implementations of the above may include methods, systems and computer program products. A method may perform one or more of the above described actions. A system may comprise a client device that stores instructions for execution by a processor coupled to the client device. The instructions, when executed, are operable to cause the processor to perform one or more of the above described actions. A computer program product may be suitably embodied in a non-transitory machine-readable medium and include instructions executable by one or more processors. The instructions may be operable to cause the one or more processors to perform the above described actions.

The details of one or more implementations are set forth in the accompanying drawings and the description, below. Other features will be apparent from the description and drawings, and from the claims.

DESCRIPTION OF DRAWINGS

FIGS. 1A-1E show screens displayed by a sample user interface running on a client device that is operable to display information on the validity of user credentials.

Like reference symbols in different figures indicate like elements.

DETAILED DESCRIPTION

Figures 1C, 1D:
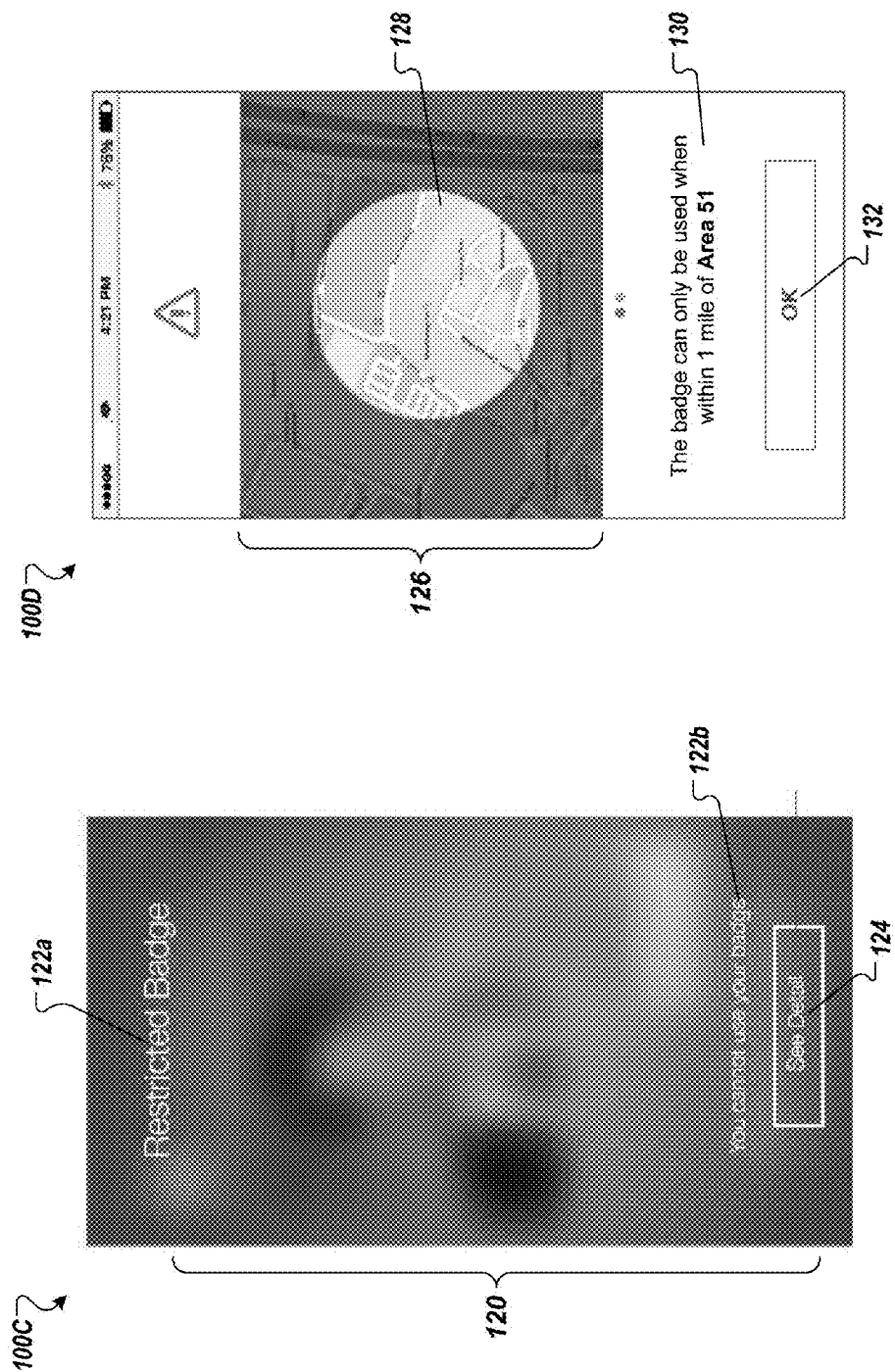

In some instances, representations of electronic credentials for individuals, or for groups of individuals, or both, are generated. The credentials may be, for example, identity credentials (driver's licenses, passports, visas, police badges, employee identity documents, etc.), health insurance cards, loyalty cards, badges reflecting membership in a group (e.g., employees of a company, students of an educational institution, gym club memberships, etc.), badges to gain entrance to a location or event, a ticket for entry to a location or event, a key that unlocks a lock (e.g., for entry to a location), etc.

Different electronic credentials may be issued by different credential issuing organizations. For example, a company may have an associated credential issuing organization issuing credentials for its employees that are used for accessing various company resources, while a physical fitness chain may have another associated credential issuing organization that issues credentials to its members for accessing the fitness centers managed by the chain.

The credentials issued by different credential issuing organizations may be managed using a credential management system, which enables a first user of the system to validate a credential presented by a second user of the system irrespective of the credential issuing organization that issued the credential. Responsive to successful validation of a credential, information associated with the validated credential (including information about the credentialed second user) may be disseminated to the validating first user.

Credentials can be maintained on and/or accessed from electronic client devices (e.g., mobile computing devices like smart phones, tablet computers, electronic book readers, or laptop computers), which are also referred to as client devices, user devices, or simply as devices. Instances of an application associated with the credential management system may run on the client devices for managing credentials stored therein. The application can represent credentials in various forms. For example, credentials can be represented by parametrically-generated graphical representations, animated graphical representations, phrases, numeric representations, and/or optical machine-readable representations.

A server, or collection of servers, may be associated with the credential management system for centralized management of credentials issued by various credential issuing organizations and for distributing credentials to appropriate users' client devices. Users and third-parties may operate the application running on their respective devices to output representations of the credentials for validation, and the representations may be validated using suitable mechanisms. For example, in some implementations, the servers associated with the credential management system may be used to validate the credentials.

For an event and/or location, a server, or collection of servers, can manage and distribute credentials to appropriate users' client devices. The representations for the credentials then can be outputted for evaluation by a credential authority at the event and/or location to confirm that the credentials presented are valid. Some representations for credentials may be presented for visual inspection. Such representations may be the same for all (or designated subgroups of) authorized invitees to an event, and the credential authority may therefore be able to confirm that the presented representations are valid by visual inspection but may be unable to determine the identity of the invitees presenting the credentials. Advantageously, some implementations described herein may generate records of usage of such visually-inspected representations as invitees enter and/or leave an event. For example, these records may be generated based on the location and/or time the invitees present the visually-inspected representations.

In some implementations, a user may gain access to a restricted resourced using credentials stored on her device. In this context, a resource may be a physical area, such as conference room in an office building or a 3-mile region surrounding an office building; an electronic resource, such as a computer or a printer; or any other suitable resource. For example, the user may interact with the credential management application on her device to output a representation of a credential for evaluation by a security guard at the entrance to a restricted office building. The guard may visually inspect the credential to confirm that the credential presented is valid, and accordingly allow the user to enter the building.

In some implementations, credentials stored in the user's device may be dynamically enabled or disabled based on some context associated with the user or the user's device. The context may be, for example, the location of the user, as determined based on the location of the user's device. Alternatively, the context may be the present time, as determined based on the time maintained by the clock on the user's device. The context also may be some other suitable feature associated with the user and/or the user's device.

As an example, the credential issuing organization associated with a company may issue a credential to a contract employee that is valid only in some locations in the office building, or for certain time periods of the day, or both. The credential management application running on the contract employee's device may determine the employee's location using location services provided by the device, and check whether the locally-managed credential is valid at the employee's present location, or at the present time, or both. If the application determines that the credential is not valid at the employee's present location, and/or at the present time, the application may automatically display a warning notification on the user interface, instead of displaying a representation of the credential. Accordingly, a security guard who sees the warning may deny the contract employee access to certain areas of the office building.

The rest of this disclosure describes in greater detail techniques by which a credential management system may determine the validity of a user's credential based on the context associated with the user's device. The context described by the examples in the following sections includes the location of the user's device, and, in some instances, the time at the user's device. However, the following implementations may be equally applicable to other forms of context associated with the user or the user's device.

The location and/or time are obtained from the user's device where the credentials are stored and managed by instances of the credential management application running on these devices. The credential management system performs the location and/or time-based validation of a credential based on policies set by the credential issuing organization that issued the particular credential. In the following description, the credential management system is also referred to as a validation system, while the credential management application is also referred to simply as the application.

FIGS. 1A-1E show screens 100A-100E displayed by a sample user interface running on a client device that is operable to display information on the validity of user credentials. The user interface (UI) may be shown on a display coupled to a client device associated with a user who accesses various resources (e.g., entrance to a restricted area or use of a restricted computer) using credentials stored in the client device. The UI may be associated with an instance of the credential management application that is executed on the client device.

Multiple credentials issued by different credential issuing organizations may be stored in the client device and managed by the credential management application. The different credentials may allow the user to access different resources associated with the respective credential issuing organizations, where the user's access to a resource may be based on policies set the corresponding credential issuing organization. These policies, which are also referred to as restriction policies, may specify the restrictions that are associated with the credentials issued by the credential issuing organization to registered users. For a particular credential, the restrictions may include areas where the credential is enabled or valid and may be used, or certain time periods (e.g., day, date, time of day, among others) when the credential is enabled or valid, or both.

A credential management system may be tasked with enforcing the policies of the credential issuing organizations for managing attempts by the user to access resources using the credentials issued to her. The credential issuing organization may send the restriction policies to servers associated with the credential management system. The credential issuing organization may ensure that the whenever the policies are updated, they are made available to the credential management system. The servers associated with the credential management system may communicate with the credential management application running on a user's device to manage the user's ability to access resources based on the validity of the credentials as specified by the restriction policies.

In some implementations, the credential management application may be a set of instructions that are stored in memory coupled to the client device. The memory may be any suitable combination of flash memory, random access memory (RAM), read-only memory (ROM), electrically erasable programmable read-only memory (EEPROM), or hard disk, among others. The instructions may be executed by one or more processors coupled to the client device.

In some other instances, the credential management application may be implemented as programmable logic on an integrated circuit (IC). For example, the application may be programmed in a field-programmable gate array (FPGA) that is included in the client device and executed by the device in conjunction with other hardware coupled to the device.

Although the following sections described the sample user interface and the credential management application with respect to a single client device, instances of the application may run on any client device that is registered with a credential issuing organization, and consequently, have one or more locally-stored credentials that are validated by the credential management system. Accordingly, the screens 100A-100E of the application user interface also may be shown on the display coupled to any client device.

FIG. 1A illustrates a sample credential 100A shown on the user interface along with an optical-machine readable representation for the credential. The credential may be associated with the user of the client device on which the sample user interface is running. The credential 100A includes captions 102 and 106; an image 104; a slider 108; and a representation for the credential 110. The caption 102 provides information identifying the type of the credential and the credential issuing organization. For example, the caption 102 identifies the credential as an "Employee ID" for "Company M Incorporated."

The image 104 is an image of the user associated with the credential. In some implementations, the image 104 allows visual identification of the employee associated with the credential.

The caption 106 provides the name, or other identifying information, or both for the user associated with the credential. For example, as shown, the caption 106 provides the name of the employee associated with the credential 100A as "John Doe" and the employee designation as "Security Team Lead."

The slider 108 may enable a user to select between different representations for the credential 100A by swiping between different positions of the slider. A representation for a credential may be a depiction or rendering corresponding to the credential that enables the credential to be validated. For example, the slider 108 may include four positions indicated by the dots included in the slider 108, as shown in FIG. 1A. In the first position of the slider, the slider 108 may cause an optical-machine readable representation for the credential 110 (e.g., a quick response (QR) code) to be displayed, as shown in FIG. 1A. A validating device can scan the portion of the client device's display showing the credential representation 110 and process the scanned credential representation to validate the credential 100A.

In some implementations, the slider 108 may not be present. This may be the case, for example, when credential 100A includes a single representation, a QR code representation.

As described previously, there may be multiple credentials associated with the user of the client device. The different credentials may be stored by the client device and managed by the credential management application executed on the client device. These different credentials may be issued by different credential issuing organizations, or by the same credential issuing organization, or by a combination of both. For example, one credential may be a gym membership badge that is issued by a credential issuing organization associated with the user's fitness center. In addition to the "Employee ID" credential 100A, the client device may store another credential issued by Company M Incorporated, such as a badge that allows access to company warehouse at a separate location. The user can select any one of these credentials using the application to output a representation of the credential on the application user interface.

In some implementations, the credential issuing organization may issue one or more electronic keys that are tied to the credential represented on the screen 100A. The electronic keys are downloaded on to the user's device from servers associated with the credential management system and managed locally by the credential management application. The electronic keys may be different representations of the user's credentials. Each key may allow the user access to a specific resource. For example, one key may allow the user to enter a restricted laboratory in company M's office premises. Another key may allow the user to use a particular computer that stores sensitive information in the company's office.

The user may access the keys by providing user input 112 on the screen 100A. In some implementations, the display coupled to the client device may be a presence-sensitive display (for example, a capacitive touch-sensitive display). In such implementations, the user may interact with the user interface of the application by touching areas of the display (e.g., using a finger or a stylus) that show various options presented by different pages of the user interface. For example, the user may provide an input on the user interface to search for peers who are associated with devices that are also running instances of the credential management application to manage credentials issued by the same credential issuing organization that has used the user's credentials.

The user may provide input 112 by touching the user interface while the credential 100A is displayed, and swiping in a particular direction (e.g., sliding from left to right or right to left, or sliding up or down). Upon receiving the user input, the user interface of the application transitions from displaying the credential 100A to displaying the screen 100B shown by FIG. 1B.

Screen 100B includes tiles 114a, 114b, 114c, 114d and 114e, and a button 116. Each of the tiles 114a, 114b, 114c, 114d and 114e is associated with a different key that is used to access a particular resource. For example, as shown, tile 114a represents a key that is used to enter the "10th Floor Conference Room" in company M's office premises. Entrance to the 10th floor conference room may be restricted, e.g., by a locked door, or a security guard stationed in front of the entrance, or both. Only persons who have keys that permit them access to the 10th floor conference room may be allowed to enter the room.

In some implementations, the user provides an input on the user's client device selecting the tile 114a. Based on the user input, the application running on the device determines the present location that is computed by location services on the device, and communicates the location to a remote validation server over a network connection, along with information about the user's credential issued by company M.

The validation server identifies the user based on the credential information, and determines, by examining company M's restriction policies known to the server, whether the user's credential is valid at the user's present location, and thereby allowing the user to access the resource at the present location, i.e., the 10th floor conference room, which is determined from the location information transmitted by the client device.

A described previously, the restriction information may be received at the validation server from company M's credential issuing organization. The restriction policies may be updated by the credential issuing organization from time to time, and the updated restriction policy information may be transmitted from the credential issuing organization to the validation servers associated with the credential management system. Based on the updates to the policies, the access enjoyed by a user to different resources may dynamically change, i.e., vary from time to time. This may be the case, for example, when the user's role within the organization, e.g., company M, changes and along with the change in role the responsibilities of the user changes, allowing the user to access some resources that were previously restricted, and/or disabling access to some resources that were previously allowed. Accordingly, by sending the location and credential information to the server for validation, the application on the user's device is able to obtain the most recent resource access information for the particular user.

In some implementations, the validation server will check for credential enablement within a certain predetermined distance, e.g., 10 feet, of the resource in question. The predetermined distance may be based on policies set by the credential issuing organization. This allows the validation server to check for validity of the credential when the user is not yet within the restricted area, but is about to enter the area. For example, when the user has to display a valid key at the entrance to the 10th floor conference room, but before entering the conference room.

Accordingly, there might be a zone of enablement around a restricted resource where the user's credential will be valid to enable the user to access or use the restricted resource. The extend of the zone may be based on distance from the resource. For example, the zone of enablement may be 10 feet from the entrance to the 10th floor conference room. If the validation server determines that the user's location is within the zone of enablement, then the validation server will respond to the application on the user's device with information indicating that the associated key is valid at that location.

In some implementations, when determining whether the user's credential is enabled for access to a resource, the validation server determines the zone of enablement by checking the distance between the present location of the device and a defined location corresponding to the resource (e.g., entrance door of 10th floor conference room). The application sends the latitude and longitude values of the present location of the user's device. These values are used to compute the distance between the present location and the defined resource location. The user is determined to be within the zone of enablement if the computed distance is within a predetermined multiplicative factor of the radius of a region around the defined resource location. For example, the predetermined multiplicative factor may be 1.5, and the user is determined to be within the zone of the enablement if the distance of the user's device from the entrance door (the defined resource location) is less than 1.5 times the radius of the region around the entrance door.

When the application receives this response, the application displays a representation of the associated key on the user interface. In the example scenario described above, the application will show, on the user interface displayed on the device, a representation of the electronic key associated with the 10th floor conference room. In some implementations, the representation of the electronic key may be a representation of the user's credential itself. The user shows the displayed representation of the key to the security guard at the entrance to the 10th floor conference room, or scans the device display showing the representation of the key using a door reader system that controls the entrance door to the conference room. The security guard sees that the representation of the key is valid and enables the user to enter the 10th floor conference room and hence allows the user to access the room. Similarly, based on scanning the device display, the door reader processes the scanned information and determines that the key representation shown on the display valid and enables the user to enter the 10th floor conference room. Therefore, the door reader unlocks the entrance door to the conference room and allows the user to access the room.

In some implementations, based on user input, e.g. the input selecting the tile 114a, the application running on the user's device may locally determine whether the associated electronic key or the user's credential is valid at the present location of the user's device. The application may make this determination without communicating with the validation server over a network connection. This may the case, for example, when no network connectivity to the server is available, such as when the user device is offline, or the server is not operational, or for any other suitable reason. This also may be the case when the application is designed to perform computations locally to make the determination about credential validity, without requiring access to server resources.

In such cases, the application obtains the device's present location as before, by querying the location services associated with the device. Then the application checks in local memory, i.e., memory coupled to the device, for stored information about the restriction policies specified by the credential issuing organization. The application checks the restriction information to determine whether the user's credential is valid at the present location of the device. If the application determines that the policy enables the user's credential at the present location, then the application shows a representation of the corresponding key on the user interface, as described previously. On the other hand, if the application determines that the user's credential is not valid at the present location, then the application shows a notification on the user interface, indicating that the associated key is not valid at the present location. Accordingly, the user may not be able to demonstrate that she is authorized to access the resource at the present location.

In some implementations, as the validity of the user's credential is being determined by the application, or the server as the case may be, there may be finite time period between receiving the user input and displaying the result. In such cases, the application may display an animation on the user interface, indicating that the credential validity determination is in progress. In addition, the application may present a notification including information (e.g., text) that describes that the validity determination task is being performed. Once the result is available, the animation and/or the notification are replaced by the information indicating the validity of the user's credential.

In some implementations, the restriction information that is locally stored in the memory coupled to the device may have been downloaded from the validation server at a prior time, e.g., when network connectivity to the validation server was available. Based on the configuration of the credential management system, updated restriction policies that are available at the validation server may be periodically downloaded to the user device for use by the application locally. The application may pull the information from the server periodically, or the server may push the information periodically, or whenever updated restriction information is received at the server from the credential issuing organization.

The frequency at which the restriction information stored locally at the client device is updated as described above may depend on other policies set by the administrator of the credential issuing organization. In some implementations, the frequency of update may depend on the criticality of the resources associated with the credential issuing organization, or the criticality of the changed restriction policies, or both. For example, for regular restriction policy updates, the information may be pulled by the application from the server periodically. However, for an urgent update, e.g., to patch a major security breach, the information may be immediately pushed by the server to the application running on the client device.

In some implementations, when the determination of credential validity is made by the server, but the application cannot send the information to the server due to the lack of a network connection to the server (e.g., when the device is in offline mode), the application may perform local validity computation if within a certain grace period since the connection to the server was lost. The grace period may be set by the credential management system, or by the credential issuing organization. For example, the application may attempt to request a credential validity check from the server and determined that the connection to the server is lost. The application last contacted the server 10 minutes earlier, while the grace period may be set at 15 minutes. In such a case, the application may perform a local validity determination. The application may attempt to contact the server again after a further 10 minutes, but the connection to the server still may not be available. The time since the last successful connection is now 20 minutes, which is greater than the 15-minute grace period. In this instance, the application may display a notification on the user interface informing the user that the credential validity cannot be determined due to the absence of the network connection to the server.

In the above manner, the grace period may be useful to allow the credential validity operations to be performed during small breaks in network connectivity. However, for longer duration breaks in connectivity, the credential validity operations are halted because the restriction policies may have been updated during the break period, and therefore a determination of credential validity based on the stale restriction information available at the device may not reflect the most up to date restrictions on the user's credential.

In some implementations, the application may continuously monitor the device location by relying on the location services of the device. Whenever the user approaches a restricted resource, the application may automatically check the validity of the user's credential for the resource, and display information about the credential validity on the user interface (that is, either display a representation of the key if access is enabled, or display a notification indicating that access to the resource is disabled). The application may perform the check and the information display proactively, without requiring any input from the user.

In some implementations, the device location may be determined using Global Positioning System (GPS) technology. For example, the location services of the device, which may include one or more processes running on the device, may be associated with GPS hardware coupled to the device, such as an integrated circuit GPS receiver (system-on-a-chip), or a GPS radio. The location services receives signals from GPS satellites using the GPS hardware and computes the device location based on the received signals. Alternatively, the location services may send the received GPS signals to a location server over a network connection, and in return get the determined location of the device from the location server. Based on the received GPS signals, the location services may update the device location continuously, or intermittently, e.g., upon significant changes in the device location. In some implementations, the location services may be managed by the underlying operating system running on the device, while the credential management application would receive the device location, as needed, based on inquiring the location services.

In some other implementations, the device location may be determined using micro-location technology or indoor position system (IPS), such as iBeacon™, or Near Field Communication (NFC). In micro-location systems, the location services running on the client device may receive signals from location-aware sensors using communication protocols such as Bluetooth™, and determine the device location based on these signals. For example, the client device may detect signals from sensors associated with the entrance door to the 10th floor conference room when it is within a certain distance (e.g., 10 feet) of the entrance door. Upon processing these signals, the credential management application running on the client device determines that the device is in close physical proximity to the 10th floor conference room resource, and accordingly it checks whether the user's credential enables it to access the resource, as described before.

The micro-location technology may allow precise location determination of the client device based on physical proximity to the location-aware sensors. This may be useful, for example, in accessing specific resources in indoor locations, such as different restricted areas in an office building, as described by the preceding examples. In contrast, GPS technology may have a lower resolution, allowing location determination of the client device in a wider area, such as 100 feet or more.

The location determined using GPS technology may be useful in establishing the validity of the user's credential in areas that are marked by virtual perimeters. A virtual perimeter, also referred to as a "geofence," may cover a certain area around a real-world geographic region or a physical resource. For example, a geofence may cover a 3-mile area around company M's headquarter building. The application running on the client device obtains the device location from location services using GPS technology, and determines that the device is in the geofenced area associated with company M's headquarters. The application checks whether the client's credential is valid in the geofenced area, and accordingly shows the representation of the credential, or a notification, on the user interface.

In some implementations, the credential management application can generate geofences so as to be notified when the user crosses geographic boundaries. For example, this capability can generate alerts when the user gets close to a specific location, leaves a specific location, and/or crosses a region boundary. In some cases, regions associated with the application are continuously tracked. If a region boundary is crossed while the application is not running on the client device, the application may be re-launched in the background to handle the event. Similarly, if the application is suspended when the event occurs, it may be woken up and given a short amount of time to handle the event. Geofences may be, for example, dynamically generated, such as in a radius around a venue or point location, or may include a predefined set of boundaries, such as streets around a venue or neighborhood boundaries.

In some situations, the user may disable the location services on the client device, e.g., to save on battery power. Accordingly, the application may not be able to obtain the location of the device. If the determination of credential validity requires that the location of the device be available, then the application may generate a notification indicating that the validity of the credential cannot be determined. The notification also may ask the user to enable location services on the device.

Returning to the screen 100B, the other tiles shown on the screen are for accessing other resources associated with company M. In some implementations, these keys may be tied to resource accesses using micro-location technology, such that the application may determine that a key is enabled only when the user is in close physical proximity to the corresponding resource, and therefore able to receive signals transmitted by sensors associated with the resource. For example, as shown, tile 114b represents a key that is enabled when the user is near the "Innovation Lab" in company M's office premises; tile 114c represents a key that is used to access the "7th Floor Offices" in company M's office premises; and tile 114d represents another key that is used to access "Area 51," which may be a different office location for company M.

The tiles 114a, 114b, 114c or 114d are used to gain access to physical locations. In contrast, tile 114e represents a key that is used to access the "HAL Supercomputer," which may be a computing resource located in company M's office premises. In this case, when the user attempts to use the HAL Supercomputer, the user may be prompted to enter an authorization key. For example, the machine may ask the user to scan the authorization key using a scanner connected to the machine. In a manner similar to that described in reference to tile 114a, the application on the user's device sends to a validation server the current location of the device and the credential information. The server determines that the user's location corresponds to the HAL Supercomputer resource. If the server determines that the credential is valid for allowing the user to access the HAL Supercomputer resource, then the server responds to the application on the user's device with an appropriate authorization key.

The application displays a representation of the authorization key on the user interface shown on the device. The user scans the device display using the scanner connected to the HAL Supercomputer, and is then logged in to use the computing resource.

In some implementations, the user may provide input 118 to view the keys that are associated with accessing the different resources. The input 118 may be provided as an alternative to, or in conjunction with, the user input selecting one of the tiles 114a, 114b, 114c, 114d or 114e. The user may provide the input 118 by touching the user interface while the credential 1008 is displayed, and swiping in a particular direction (e.g., sliding from left to right or right to left, or sliding up or down). Upon receiving the user input, the user interface of the application transitions from showing the tiles to showing a representation of the key corresponding to the selected tile.

Returning to the screen 100B, in some implementations, the user may add a new key for a new resource by selecting the button 116. On receiving the user input selecting the button 116, the application may transition to a new screen and provide options to the user to specify the information corresponding to the new key for the new resource.

Although the above section describes the different tiles as representing different keys associated with accessing different resources, in some implementations, the same key may allow access to the different resources. In such implementations, some or all of the different tiles may be associated with the same key. The single key may be a credential issued to the user. When the user is in a restricted location (e.g., a geofenced area) where the user's credential is valid, the application running on the user's device may display a representation of the credential on the application user interface on the device display. For example, the application may display the screen 100A. The user can show the credential representation displayed on the screen 100A to a security guard, or scan the display using a door reader as the case may be, to gain access to the restricted location.

In some implementations, if the user's credential is restricted or invalid for access to a resource, then the application may present the screen 100C on the user interface, as shown by FIG. 1C. The screen 100C includes an obscured representation 120 of the credential, notification texts 122a and 122b, and a button 124.

The obscured representation 120 may be an obscured view of the user's credential. By obscuring the credential representation, the application may indicate to the observer that the credential is not valid at the present location of the user's device. In contrast, in a location where the credential is valid, the credential may be represented clearly, such the details of the credential may be readily legible to an observer (e.g., a security guard).

In addition, or as an alternative to, the obscured representation 120, a notification may be shown on the user interface indicating that the credential is not valid at the present location of the device. In some implementations, the notification may include descriptive text overlaid on the obscured representation 120 of the user's credential. For example, as shown, the notification may include the descriptive text 122a, which states that this is a "Restricted Badge," thereby notifying the observer that the obscured representation 120 visible in the background is a credential that is restricted, i.e., not valid at the present location. The notification also may include additional text, such as 122b, informing the user that the credential cannot be used for access at the present location of the device.

The button 124 may provide an input option to the user to view additional details about the restriction indicated by the obscured representation 120 and/or the notification texts 122a and 122b. When the user provides an input selecting the button 124 (e.g., by touching an area of the device display proximate to the portion of the user interface showing the button 124), the application may transition the user interface to the screen 100D shown in FIG. 1D.

The screen 100D includes a map 126, a marked region 128 within the map, a notification 130 and a button 132. In some implementations, the map 126 may cover a portion or all of the screen 100D, providing information on a restricted area where the user's credential is valid. The map 126 may display a wider geographic area that includes the restricted area and its surroundings up to a certain distance. The restricted area itself may be shown on the map as the marked region 128. In some implementations, the region 128 may be presented as a spotlighted region, with the rest of the map partially darkened, as shown. The perimeter of the spotlighted region may represent the geofence. When the user's location is inside the perimeter of the geofenced region 128, the credential may be valid and clearly represented on the user interface. When the user's location is outside the perimeter of the geofenced region 128, the credential may be restricted or invalid, and shown by the obscured representation 120. In some implementations, as shown, the geofenced region may be circular, with the circumference of the circle being the virtual fence.

In addition to providing a visual indication of the geofenced region using the map 126 and the marked region 128, the application may display the notification 130 on the screen 100D. The notification 130 provides descriptive information to the user specifying the contours of the geofenced region. For example, the user's credential may authorize the user only to access Area 51. Based on policies set by the credential issuing organization, the zone of enablement may be a region with 1-mile radius around Area 51. In this case, as shown, the notification 130 may inform the user accordingly, stating that "The badge can only be used when within 1 mile of Area 51."

The notification, in conjunction with the map 126 and the marked region 128, provides the detailed information regarding the area where the user's credential is valid. Once the user has perused the information provided by the screen 100D, the user may revert to the screen 100C by providing input selecting the button 132.

In some implementations, the user's credential may be valid only for a certain period of time, as described previously. In such implementations, when the user attempts to use the credential to access a resource, the application running on her device may obtain the current time and determine whether the user's credential is enabled or valid at the current time. If the application determines that the user's credential is valid at the current time, then the application may output a clear representation of the credential on the user interface, e.g., as shown by the screen 100A. On the other hand, if the application determines that the user's credential is not valid at the current time, then the application may output an obscured representation of the credential on the user interface, as shown by the representation 120 on the screen 100C. In such cases, when the user presses the button 124, the application may transition the user interface to the screen 100E, shown in the FIG. 1E.

Figure 1E:
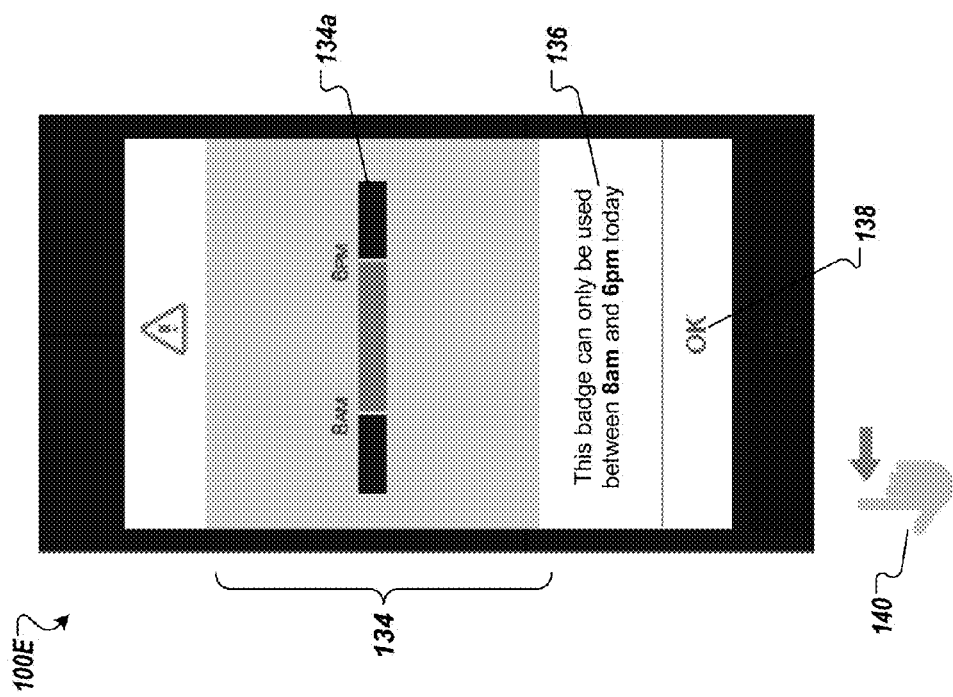

The screen 100E includes a graphical representation 134, a time bar 134a, a notification 136 and a button 138. In some implementations, the graphical representation 134 may cover a portion or all of the screen 100E, providing visual information on a time period during which the user's credential is valid, which is also referred to as the validity time period. The graphical representation 134 may display a time bar 134a, with a portion of the time bar, which corresponds to the validity time period, highlighted. For example, as shown in FIG. 1E, the time bar 134a shows the time period between 8 am and 6 pm highlighted in a different color than the rest of the bar, indicating that the validity time period is between 8 am and 6 pm.

In addition to providing a visual information about the validity time period using the graphical representation 134 and the time bar 134a, the application may display the notification 136 on the screen 100E. The notification 136 provides descriptive information to the user about the validity time period. For example, based on policies set by the credential issuing organization, the user's credential may be valid on the present day only in the time period between 8 am and 6 pm. In this case, as shown, the notification 136 may inform the user accordingly, stating that "This badge can only be used between 8 am and 6 pm today."

In some implementations, the validity time period for the user's credential may vary, e.g., the time period may be 8 am-6 pm on one day, but 9 am-5 pm on the next day. Accordingly, the validity time period indicated by the time bar 134a in the graphical representation 134 and the notification 136 may change from one day to another. However, in other implementations, the validity time period for the user's credential may be a constant, e.g., 8 am-6 pm on every day.

The notification 136, in conjunction with the graphical representation 134 and the time bar 134a, provides the detailed information regarding the validity time period for the user's credential. In some implementations, once the user has perused the information provided by the screen 100E, the user may revert to the screen 100C by providing input selecting the button 138. In some other implementations, the user may revert to the screen 100C by providing the input 140, e.g., by touching the user interface while the screen 100E is displayed, and swiping in a particular direction (e.g., sliding from left to right or right to left, or sliding up or down).

In some implementations, the validity of the user's credential may be based on both location and time. For example, the user's credential may be geofenced in Area 51, i.e., valid only within 1 mile of Area 51. In addition, the user may be allowed to access Area 51 only between 8 am and 6 pm during the day. Accordingly, if the user is located outside the Area 51 geofence, or the time is outside the validity time period, or both, then the application may show the screen 100C when the user attempt to use the credential. In such cases, when the user provides the input selecting 124, the application may transition to the screen 100D or 100E.

In some implementations, if the screen 100D is displayed, the user may transition to the screen 100E by touching the user interface, and swiping in a particular direction (e.g., sliding from left to right or right to left, or sliding up or down). Alternatively, if the screen 100E is displayed, the user may transition to the screen 100D by touching the user interface, and swiping in a particular direction (e.g., sliding from left to right or right to left, or sliding up or down). In this manner, the application may present the screens 100D and 100E in conjunction to provide information on both the geofence and the validity time period that are simultaneously enforced.

In some implementations, after the application running on the user's device has provided information on the user interface indicating the validity of the credential (e.g., a clear representation of the credential as shown by the screen 100A), the application may periodically re-check the device location and accordingly update the credential validity information as needed. This may be useful, for example, when the user is moving around and may enter and leave the restricted resource (e.g., geofenced region). The application may automatically provide notification on the user interface indicating the updated credential validity information.

In some implementations, the application may start a counter to measure the time after the initial display indicating the validity of the credential. In such cases, the application will gather updated information about the user's location, re-check the validity of the credential based on the updated location, and display information about the validity of the credential at the updated location only when the counter reaches a predetermined time period, e.g., 5 minutes. This may be useful, for example, to prevent showing frequent notifications about the validity of the credential, which may be distracting to the user.

The predetermined time period may be set in the application itself. The time period may be configurable by the user, or may be a fixed value (e.g., determined by the credential management system). Alternatively, the time period may be set by the credential issuing organization associated with the credential.

In some implementations, the counter will be reset when the user leaves the restricted location (e.g., the geofenced region). This may be useful, for example, to avoid showing multiple notifications if the user moves in and out of the geofenced region frequently. As an example, the user enters a geofenced region where her credential is valid. The application will display information about the validity of the credential on her device. At this time, the application will start the counter, and the counter must reach the predetermined time period before the application will again display information about the validity of the credential. Upon each exit from the region, the counter will be reset to avoid having the user receive multiple notifications if she comes in and out of the geofenced region.

In some implementations, upon updating the device location, the application may determine that the credential is not valid anymore at the updated location. This may be the case, for example, when the user has moved outside the geofenced region where the credential was valid. In such cases, the application may automatically provide display the screen 100C notifying the user that the credential is not valid anymore at the present location. Alternatively, the application may provide display the screen 100C upon receiving a user input querying about the validity of the credential at the present location.

In some implementations, when a credential, which was previously valid, is no longer valid due to the user moving outside the geofenced region, or the present time being after the validity time period, the application may revoke the credential, i.e., render it permanently invalid. The revocation may be based on policies set by the credential issuing organization.

In some implementations, the application may revoke the credential only if the user attempts to use a credential that is invalid for a certain number of times. For example, the user may attempt multiple times to user her credential in a geofenced region where the credential is not valid. The application may log the number of attempts made by the user to access the invalid credential. When the number of attempts exceeds a predetermined number, the application revokes the credential. The predetermined number may be based on policies set by the credential issuing organization.

In the manner described in the preceding sections, a user may obtain a credential that allows access to resources in specific areas, or at specific times, or both, based on the authorizations accorded to the user by the credential issuing organization. The credential may be rendered invalid automatically when the user leaves the area where the credential is valid, or deviates from a predetermined path or pattern of behavior (e.g., a credential would only be valid at certain conference rooms at a company's office premised).

Figure 2:
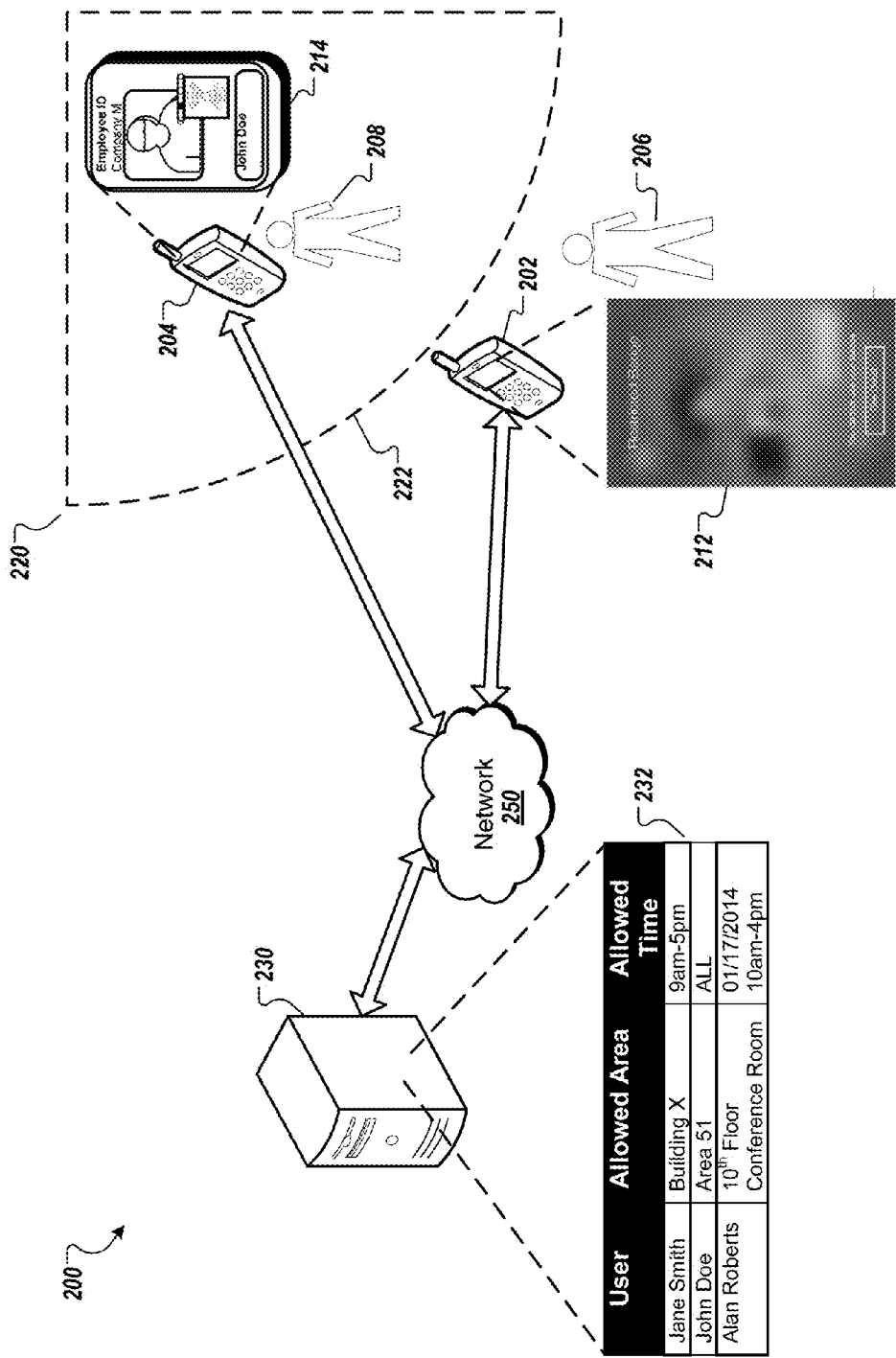
FIG. 2 shows an example system for performing validation of a user's credential.

FIG. 2 shows an example system 200 for performing validation of a user's credential. The system 200 may be a credential management system that is operable to determine validity of a user credential associated with the client device and display that information to an observer. As discussed in the preceding sections, an instance of the credential management application running on the client device and that is associated with the credential management system 200 may be used to determine the validity of a user credential associated with the client device based on the device's location, or the time, or both.

The system 200 includes client devices 202 and 204 that are associated with users 206 and 208 respectively; a validation server 330; and a network 350. The user 206 is outside a restricted (i.e., geofenced) region 220, while the user 206 is within the restricted region 220. The perimeter of the restricted region is indicated by 222. UIs 212 and 214 are displayed on the client devices 202 and 204 respectively. The server 330 maintains information about the validity locations and validity time periods about users' credentials in a data structure 232.

The geofenced region 220 may be associated with a credential issuing organization that issued the credentials to both users 206 and 208. For example, the geofenced region 220 may correspond to the office premises, including the zone of enablement surrounding the office premises, of company M that issued the credentials to 206 and 208. The credentials associated with the users may be valid when the users are within the geofenced region 220, but may be restricted or invalid when the users are outside the geofenced region.

As illustrated in FIG. 2, the user 206 may attempt to view her credential while located outside the geofenced region 220. In some implementations, the user 206 interacts with the application running on the device 202 to check whether the credential is valid at her present location, while in other implementations, the application automatically displays information on the credential validity at the present location. In either case, the application determines that the device 202 is outside the geofenced region 220 and therefore the credential is restricted at the present location of the user. Accordingly, the application displays information on the user device 202 indicating that the credential is restricted, e.g., by displaying an obscured representation 212 of the credential on the device display.

In some implementations, the application may make the determination about the validity of the credential locally, using information about the restrictions associated with the device 202, or the credential issuing organization of company M, or both, stored in memory coupled to the device 202. This may be the case, for example, when the application does not have network connectivity to validation server 230 (e.g., when the device 202 is operating in offline mode), or when the application is configured to check credential validity locally, irrespective of whether a network connection to the server 230 exists. The application may periodically download information about the restrictions associated with the device 202, or the credential issuing organization of company M, or both, from the validation server 230 through one or more network connections established over the network 250.

In contrast to user 206, the user 208 may attempt to view her credential while located inside the geofenced region 220. The user 208 either may interact with the application running on the device 202 to check whether the credential is valid at her present location, or the application automatically displays information on the credential validity at the present location. In either case, the application determines that the device 202 is located inside the geofenced region 220 and therefore the credential is enabled or valid at the present location of the user. Accordingly, the application displays information on the user device 202 indicating that the credential is valid, e.g., by displaying a clear representation of the credential 214 on the device display.

In some implementations, the application running on device 202 or 204, or both, may contact the validation server 230 to make the determination about the validity of the user's credential. The application may send to the validation server 230 information about the credential associated at issue and the location of the associated device. In such implementations, the validation server 230 responds with information about whether the credential is valid at the location of the device.

Having the server 230 determine the validity of the credential may be useful when making the determination based on the most up to date restrictions is important, e.g., when the policy set by the credential issuing organization requires immediate compliance with the latest restrictions. In some implementations, the credential issuing organization sends the updated restriction information to the server 230 immediately upon the updates, thereby ensuring that the server has the latest policy information. In contrast, the application running on a client device may download the restriction information from the server periodically. The information at the server may have been updated since the last download by the application. Therefore, the application may use stale restriction information when it checks credential validity locally, until at least the next time the information is downloaded from the server.

However, in some implementations, the restriction information available locally at the device may be kept continuously in sync with the restriction information available at the server 230. In such cases, every time the information is updated at the server, it is also sent to the client device immediately. Therefore, the application will use the most up to date restriction information when it checks credential validity locally.

In operation, the server 230 manages and/or stores one or more credentials, associates users and groups of users with appropriate credentials, and provides the credentials to users' client devices and/or processing systems (e.g., operated by credential authorities) for validation. The server 230 can be any suitable computer or collection of computers executing software capable of managing, distributing, and/or validating representations of credentials for users and groups of users via a network 250 as described herein.

In some implementations, the server 230 may store the restriction information about the credentials of different users associated with the credential issuing organization in the data structure 232, which may be a table (e.g., hash table), a linked list, a matrix, or some other suitable structure. As described previously, the restriction information may be received from the credential issuing organization.

As illustrated in FIG. 2, the data structure 232 may be a table, with each row of the table corresponding to a credential issued to a particular user. The restriction information corresponding to a user may include the identity of the user (e.g., name and/or other suitable identifying information), the resource where the credential is valid (e.g., the geofenced region where the credential is valid), and the credential validity time, or some suitable combination of these fields. For example, as shown, the table 232 indicates that for user "Jane Smith," the allowed area (i.e., the geofenced region) where the associated credential is valid includes "Building X" and the allowed time (i.e., the credential validity period) is the time period "9 am-5 pm." In contrast, for user "John Doe," the associated credential is valid in "Area 51," but the allowed time is "ALL," indicating that there is not restriction on the allowed time. Accordingly, John Doe may use his credential to access Area 51 at any time.

The restriction information corresponding to user Jane Smith's credential indicates that the allowed time is applicable on all days, i.e., there is no specific day or date restriction. In contrast, the restriction information for user "Alan Roberts" indicates that the associated credential is valid in the "10th Floor Conference Room," and in the time period between "10 am-4 pm" only on a specific date, "01/17/2014." This may be the case, for example, when Alan Roberts is a temporary visitor to the office premises of company M who is allowed access to the 10th floor conference room for a meeting between 10 am and 4 pm on the date Jan. 17, 2014. As such, the credential issuing organization has issued a temporary credential that Alan Roberts may use to access the conference room resource only on the specific date and time period. If Alan Roberts attempts to show the credential at any other location and/or at any other time, the application will indicate that the credential is invalid, e.g., by displaying the obscured representation 212 on Alan Roberts' client device. Jane Smith, however, may be a regular employee having her office in Building X on the premises of company M and is therefore allowed access to Building X between 9 am and 5 pm every day.

Credentials, user accounts, group accounts, and administrative accounts can be stored in a database (e.g., MySQL, PostgreSQL, MS SQL Server, MongoDB), or other suitable data structure that can be accessed by the server 230. In some implementations, the server 230 may access the stored credentials and/or user accounts via web services such as representational state transfer (REST) style services.

As an initial step, the server 230 creates a credential based on input provided by a credential issuing organization (e.g., an employer). In some implementations, multiple different credential issuing organizations (e.g., different entities and/or organizations) may issue credentials using the same server 230. The credential may include a variety of information such as a credential identifier (e.g., a number or alphanumeric character string that uniquely identifies a credential), an indication of the grantor of the credential, information about the user to whom the credential issuing organization granted the credential, an indication of one or more permissions granted by the credential issuing organization to the user, a description of an event or location associated with the credential, and/or third-party instructions (e.g., instructions governing what information associated with the user may be disseminated to third party users that request validation of the user's credential).

In some implementations, the instructions may include information identifying a type, classification, or rank of the validator's credential that can be enabled to access private information associated with the validated credential. For example, the private information associated with an employee badge for a company may be shared with the validator when the validator's credential is: (i) an employee badge of the same company; and/or (ii) a manager or supervisor badge associated with another employer that is a business partner of the validatee's company.

Alternatively or in addition, the instructions may include information identifying particular third-parties (e.g., names, credential identifiers, and/or user identifiers) who may access the validatee's private information. In some implementations, the instructions also may include a temporal condition that identifies one or more time periods during which the sharing of private information is enabled. For example, the private information associated with the validated credential may only be accessible during regular business hours. During other time periods, only the public information associated with the validated credential may be accessible.

In some implementations, the server 230 may present a suitable interface to the credential issuing organization for creation of credentials. For example, the server 230 may present a web interface through which the credential issuing organization can interact using a web browser. In other implementations, the server 230 may be directly accessible via a graphical-user interface or an application running on a mobile device. Any suitable interface can be used that enables the creation and storage of credentials, and user accounts. In addition (or as an alternative) to creation of credentials by credential issuing organizations, credentials may be created at the request of registered users through a web-based or other interface, or through any other suitable mechanism such as sending email or short message service (SMS) transmissions to credential issuing organizations. In some implementations, registered users may be able to create credentials by use of an application running on a client device.

The interface for the creation of credentials may provide a credential issuing organization the ability to associate conditions with the credentials, such as instructions for sharing private information associated with the credentials, as discussed above. For example, the interface may show a hierarchical menu of potential third-parties who can access the private information associated with the credential, and allow the credential issuing organization to identify the desired third-parties. These potential third-parties may be identified, for example, by name and/or by a type of credential the third-party must possess to access the private information. For example, the potential third-parties may include particular individuals such as "John Doe," and/or particular credentials such as "Corporate Security Council Badge" or "Company M Employee Badge."

In some implementations, a credential issued by a credential-issuing organization may be represented as any suitable data object, such as an eXtensible Markup Language (XML) or JavaScript Object Notation (JSON) object. In such implementations, the "private" information associated with the credential may be identified within the JSON object. In some implementations, information that is not identified as private may be considered as public information. However, in other implementations, both the private and public information may be explicitly identified.

The following example shows a sample JSON object for a credential, which includes a badge for a user named "John Doe" associated with organization "Company M." The private information in the credential is indicated with the tag "private."

The credential may include different types of private information, which are shown as different attributes in the JSON object associated with the credential. For example, in the exemplary JSON object shown below, the private information includes information on the user's department within the company (indicated as an attribute named "group"), which is of "type" "string" with a value "Administration." The private information also includes the name of the user's supervisor (indicated as an attribute named "supervisor"), which is of "type" "string" with a value "Jane Smith." A validator who is enabled to access the above private information may determine that the user John Doe is in the Administration department in Company M, and the user's supervisor is Jane Smith.

The above may be considered as detailed personal information about the user associated with the credential that is private. The private information also may include user authentication/log-in information, which may be verified by third-party applications when the user attempts to access resources associated with the third-party applications. For example, the exemplary JSON object below includes the user's login name for accessing a particular resource (indicated as an attribute named "login_name"), which is of "type" "string" with a value "john.doe." As another example, the private information includes an access control identifier (shown as attribute "access_control_id") that is of type "number" and has a numerical value "1600341998." The user's login name and the access control identifier may correspond to different resources. For example, the login name may be used to access a web-based email account, while the access control id may be used to unlock a door for accessing a conference room at Company M's premises.

The other information included in the exemplary JSON object below, such as the user's name (e.g., "John Doe"), the user's title (e.g., "Chief Security Officer"), and the organization (e.g., "Company M") may be public information. The JSON object also may include other fields or attributes and their associated values, which are indicated in the example shown below by ellipsis (i.e., " . . . ").

```
{
    "badges":
    [
        {
            "badgeinfo":{
                "name": "John Doe",
                "title": "Chief Security Officer",
                "orgname": "Company M",
                "expiration":31234123, //UNIX timestamp
                "cache_until":1335195206, //UNIX timestamp
                "extra": "jdoe@companym.com",
                "photo": {
                    "desc":...,
                    "type":...,
                    "value":... // or "reference"
                }
            },
            "badgeinfo_additional":[
                {
                    "name":...,
                    "desc":...,
                    "type":...,
                    "value":... // or "reference"
                },
                ...
            ],
            "private":[
                {
                    "name": "group",
                    "type": "string",
                    "value": "Administration"
                },
                {
                    "name": "supervisor",
                    "type": "string",
                    "value": "Jane Smith"
                },
                {
                    "name": "login_name",
                    "type": "string",
                    "value": "john.doe"
                },
                {
                    "name": "access_control_id",
                    "type": "number",
                    "value": "1600341998"
                },
            ],
            "meta": {
            "format": {
                ...
                }
            }
        },
        {
            ...
        }
    ]
}
```

The server 230 also may present an interface so that users and/or credential issuing organizations can create user accounts for individual users and groups of users. For example, the server 230 may present a web interface through which credential issuing organizations can interact via a Web browser. Additionally or alternatively, the server 230 may be directly accessible via a graphical-user interface or an application on a mobile device. User accounts may be stored in a table or collection of tables in a database, or in any other suitable data structure accessible by the server 230. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device.

As an example, a Mr. John Smith may request a new user account from the server 230 using an application executing on his client device. The server 230 can then create database entries representing a user account for Mr. Smith. A credential issuing organization could then create a row in another table for a group identified as employees of Company X. The grantor and/or server 230 could then link the database entry for Mr. Smith to the group account for Company X through use of a linking table.

Once credentials and users, or groups of users, have been created, credential issuing organizations and/or users can associate the credentials with users, or groups of users. For example, the server 230 may present a web interface through which grantors can interact via a Web browser to link a given credential to a given user or group of users. In other aspects, the server 230 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 230 also may notify the users that they have been associated with the credential(s), for example by pushing notifications to the respective users' client devices. Such notifications may include the credential identifier and/or a key for the user.

As described herein, a key may be any suitable alphanumeric code that is unique to a given user. For example, a key may be a symmetric key or shared secret between the client device and the server that can be used to maintain a private information link. In other implementations, the key may be a private key and/or public key that can be used with a public-key cryptographic system. The key may be of any suitable length such as, for example, 80 bits, 128 bits, or 256 bits. In some implementations, an application executing on the client device may have the key pre-installed, or may receive a key when a user first runs the application and creates a user account associated with the application, or may receive a key when a user logs into the application from the client device. In some implementations, the client device may receive the key from the server in a key exchange (e.g., a Diffie-Hellman key exchange).

Once credentials have been associated with appropriate user and/or group accounts, the credentials can then be distributed to client devices for the appropriate users via the network 250. For example, the network 250 may be a local area network ("LAN") and/or a wide area network ("WAN"), e.g., the Internet. In some versions, the server 230 may communicate with the client devices via SMS or multimedia messaging service (MMS). The server 230 may access user accounts in a database to locate the appropriate users' client devices.

Client devices 202 or 204 can receive the credentials associated with their respective users 206 or 208 and store them in any suitable memory for later retrieval. A given user 206 or 208 may be associated with multiple different credentials. Furthermore, some or all of the credentials associated with a user 206 or 208 may be accessible on a user's client device 202 or 204 respectively. In particular, software applications executing on the client devices 202 or 204 can retrieve the credentials associated with users 206 or 208 respectively, so they can be used for generating and presenting a representation of the credential (e.g., to a validation entity for validation). The client devices 202 or 204 may be any type of computing device, including but not limited to a mobile phone, smart phone, personal digital assistant (PDA), music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

Figure 3:
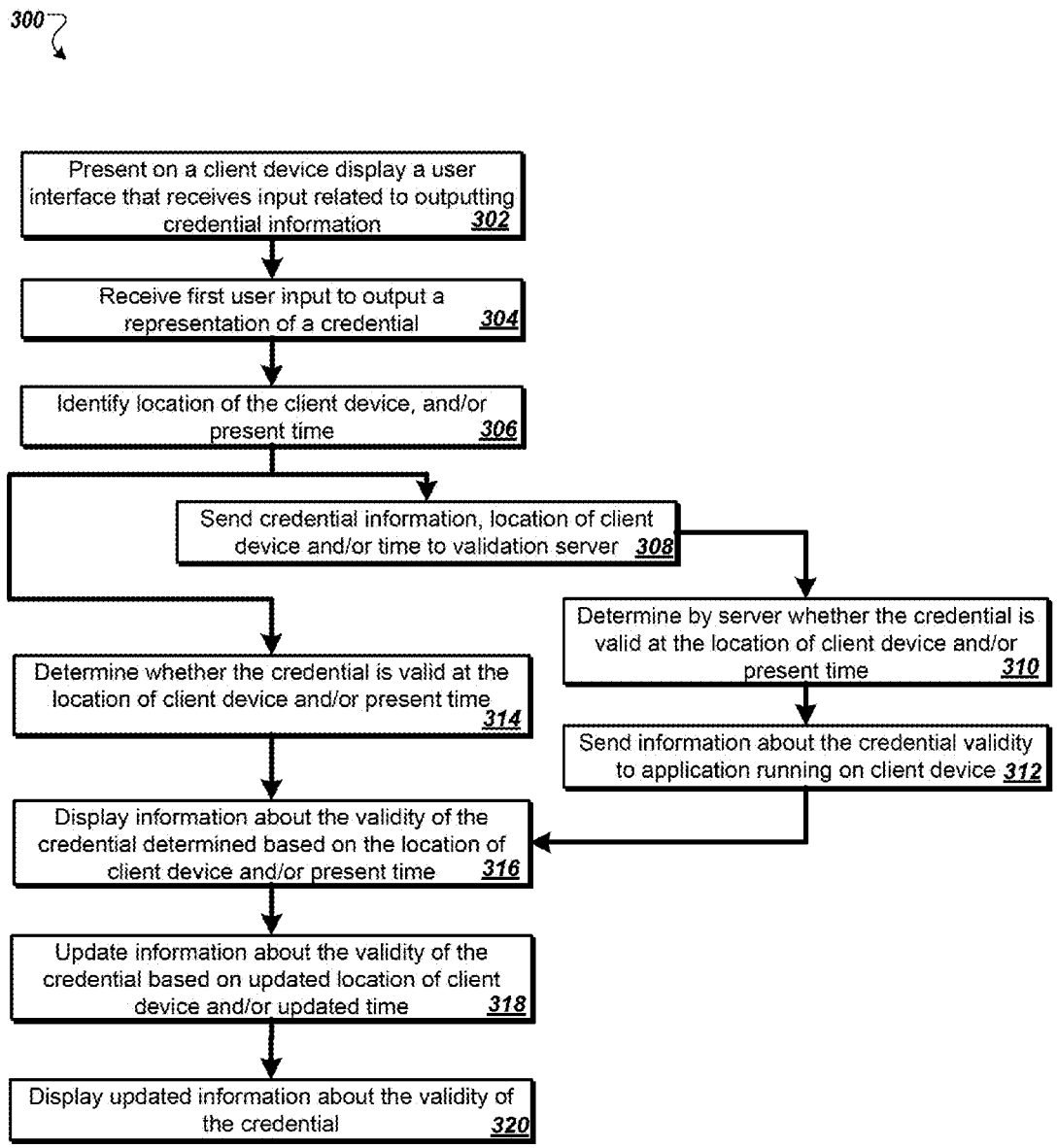
FIG. 3 illustrates an example process for performing validation of a user credential based on the user's context.

FIG. 3 illustrates an example process 300 for performing validation of a user credential based on the user's context. The context may be the location or the time, as determined from the location of the user's device or the time at the user's device. The process 300 may be performed, for example, by the credential management application running on client device 202, or 204, or both. In some implementations, the application may perform the process 300 in conjunction with the server 230. Accordingly, the following description describes the process 300 as performed by the components of the system 200. However, in other implementations, the process 300 also may be performed by other systems, including other client devices and servers.

At 302, the credential management application executed on a client device presents, on the client device display, a user interface that receives input related to outputting credential information. For example, the user 206 may launch the credential management application on the client device 202. Upon launching, the application may present the associated user interface on the device display. The user interface may show a screen, such as 100A, presenting a representation of the user's credential.

At 304, the application receives first user input to output representation of a credential. For example, the user 206 may provide the input 112 from the screen 100A to display electronic keys that allow the user to access various resources in the office premises of company M. As described previously, the electronic keys may be different representations of the user's credential. In some implementations, there may be a single electronic key or credential representation that allows the user to access the different resources.

In some implementations, the validity of the electronic keys may be based on determining the device location using micro-location technology. In some other implementations, the validity of the electronic keys may be based on determining the device location using GPS technology. In other implementations, the validity of the electronic keys may be based on particular dates and time periods, as an alternative or in addition to checking the validity of the electronic keys may be based on determining the device location. In some implementations, the first input may include the user selecting one of the tiles 114a,114b, 114c, 114d or 114e, or providing the input 118, to view the electronic key.

Upon receiving the first user input, at 306 the application identifies the location of the client device, and/or the present time. For example, the application obtains information about the location of the client device 202 from location services running on the device. The location services may determine the device location using GPS, or micro-location technology, or both, as described previously. In addition, or alternatively, the application obtains the present time at the client device, e.g., from an internal clock managed by the operating system running on the client device.

In some implementations, based on the first user input, at 308, the application sends the credential information, location of the client device and/or the time to the validation server. For example, the application sends information about user 206's credential to the validation server 230, along with the obtained location information about the client device 202, and/or the obtained time at the client device. As described previously, this may be the case when the validation server is tasked with determining the validity of the user's credential based on the location of the user's device and/or the present time at the user's device. This may be useful in situations where strict compliance with the restriction policy set by the credential issuing organization requires determination of the credential validity based on the most up to date restriction information issued by the credential issuing organization.

In implementations where the server is tasked with determining the validity of the user's credential, at 310, the server determines whether the credential is valid at the location of the client device, and/or at the present time. For example, the server 230 receives a message from the client device 202 that includes credential information associated with the user 206, and information about the location of the device 202, and/or information about the present time at the device 202. In this context, the information about the present time at the device 202 indicates the time at which the information was sent by the application running on the device 202, which may be earlier than the time when the server reads the information. In some implementations, appropriate correction mechanisms may be implemented to account for the difference in times.

The server determines whether the user 206's credential is valid at the location of the device 202, and/or at the present time. For example, as described previously, the server 230 checks the restriction policy of the credential issuing organization that is locally stored in the data structure 232. Depending on whether the restrictions associated with the credential are based on area, or time, or both, the server 230 identifies, from the data structure 232, the allowed area where the user 206's credential is valid, and/or the allowed time period when the credential is valid. If the credential is restricted based on area, the server checks whether the location of the device 202 is within the allowed area. In addition, or alternatively, if the credential is restricted based on a timer period, the server checks whether the time at the device 202 is within the allowed time period. If the server determines that the location of the device 202 is within the allowed area, and/or the time at the device 202 is within the allowed time period, as the case may be, then the server determines that the credential is valid at the present location of the device 202, and/or at the present time of the device 202.

In some implementations, the application running on the client device may locally determine the validity of the user's credential at the current location of the client device and/or the present time at the client device. As described previously, this may be the case when the application is operable to make the determination based on restriction information that is locally stored in memory coupled to the client device. In such cases, after identifying, at 306, the location and/or present time at the client device, at 314 the application determines whether the credential is valid at the location of the client device and/or the present time. For example, as described previously, the application running on client device 202 checks the restrictions associated with the user 206's credential based on information previously downloaded from the server 230 and stored locally at the client device. In a manner similar to that described in the preceding section with reference to the determination by the server 230, the application determines whether the user 206's credential is valid at the present location of the device 202, and/or at the present time of the device 202.

At 316, the application displays information about the validity of the credential that is determined based on the location of the client device and/or the present time. For example, after determining the credential validity locally, or after receiving information about the credential validity from the server 230, the application running on client device 202 displays information about the credential validity on the client device. If the credential is determined to be valid at the present location of the client device 202, and/or the present time, then the application may show the screen 100A on the user interface. On the other hand, if the credential is determined to be restricted or invalid at the present location of the client device 202, and/or the present time, then the application may show the screen 100C on the user interface. In conjunction, the application also may present the screens 100D and/or 100E based on user input, to provide the user 206 information on the area where the credential is valid, and/or the time period when the credential is valid.

The application may periodically re-compute the validity of the credential based on updated information about the device location, and/or the updated time. For example, at 318, the application may update information about the validity of the credential based on updated location of client device and/or the updated time. As described previously, the application may start a counter and update the credential validity information when the counter reaches a certain predetermined value. The application may perform the periodic update automatically. This may be useful to ensure that the user is provided with the most up to date information about the validity of the user's credential, even if the user does not provide an input seeking the updated information.

At 320, the application displays updated information about the validity of the credential. For example, based on re-computing the credential validity when the counter reaches the predetermined value, the application running on client device 202 may determine that the user 206's credential is restricted at the updated location of the device 202. The credential may have been valid when the determination was made in the preceding cycle. This may be the case, for example, when the user 206 was within the geofenced region 220 in the preceding cycle, where the user's credential was valid. But the user 206 has since moved outside the region 220, and consequently the user's credential is no longer valid at the present location of the device 202. Accordingly, the application may show a notification on the display of the device 202, informing the user that the credential is not valid at the present location. For example, the application may present the screen 100C on the display of the device 202, replacing the screen 100A that may have been shown previously when the user was within the geofenced region 220 and therefore the credential was determined to be valid.

In the above manner, the process 300 may provide context-aware information to the user of a client device, informing the user whether the user's credential is valid at the current location of the user, as determined based on the location of the client device. In addition, or alternatively, the process 300 may be used to inform the user whether the user's credential is valid at the present time, as determined based on the time measured by the client device.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A computer program product, implemented in a non-transitory computer-readable medium storing instructions that, upon execution by one or more processors, cause the one or more processors to perform operations comprising:
   presenting, by an application executed on a client device and on a display coupled to the client device, a user interface that receives input related to outputting credential information, wherein the application is configured to manage credentials that are associated with a validation system;
   receiving a first trigger to provide a representation of a first credential;
   in response to receiving the first trigger, identifying a first location of the client device;
   based on identifying the location of the client device, determining, by the application, that the first location of the client device is associated with a first region where the first credential is enabled for validation;
   in response to determining that the first location of the client device is associated with the first region where the first credential is enabled for validation, displaying, on the user interface, the representation of the first credential;
   receiving a second trigger to update the representation of the first credential;
   in response to receiving the second trigger, identifying an updated second location of the client device;
   based on identifying the second location of the client device, determining, by the application, that the second location is associated with a second region where the first credential is not enabled for validation; and in response to determining that the second location is associated with the second region where the first credential is not enabled for validation, presenting, on the user interface, information indicating that the first credential is not enabled for validation at the second location of the client device.

2. The computer program product of claim 1, wherein determining that the first location of the client device is associated with the first region where the first credential is enabled for validation comprises:

transmitting, by the application and over a network connection through the client device, information corresponding to the first location of the client device to a remote server associated with the validation system;

receiving, at the application and over the network connection through the client device, information from the remote server indicating the first region where the first credential is enabled for validation; and determining, by the application, whether the first location of the client device is within the first region indicated by the information received from the remote server.

3. The computer program product of claim 2, wherein determining whether the first location of the client device is within the first region indicated by the information received from the remote server comprises:

identifying, based on the information received from the remote server, a reference location associated with the first region; and determining whether the first location of the client device is within a predefined distance of the reference location.

4. The computer program product of claim 1, wherein determining whether the first location of the client device is associated with the first region where the first credential is enabled for validation comprises:

accessing, by the application, information that defines the first region and that is stored at the client device; and determining, by the application, whether the first location of the client device is within the first region based on the information that defines the first region and that is stored at the client device.

5. The computer program product of claim 4, wherein accessing the information that defines the first region and that is stored at the client device comprises:

determining, by the application, that a remote server associated with the validation system is inaccessible over a network connection through the client device, wherein the remote server is configured to provide updated information indicating the first region where the first credential is enabled for validation; and in response to determining that the remote server is inaccessible, accessing the information stored at the client device.

6. The computer program product of claim 1, wherein receiving the second trigger to update the representation of the first credential comprises:

starting, by the application, a counter based on displaying the representation of the first credential on the user interface; and based on the counter reaching a particular value, identifying the updated second location of the client device.

7. The computer program product of claim 1, wherein presenting the information indicating that the first credential is not enabled for validation at the second location of the client device comprises:

displaying, on the user interface, a notification that provides information descriptive of the first region where the first credential is enabled for validation.

8. The computer program product of claim 1, wherein presenting the information indicating that the first credential is not enabled for validation at the second location of the client device comprises:

obscuring the representation of the first credential that is displayed on the user interface; and presenting, as an overlay on the obscured representation of the first credential, information indicating that the first credential is restricted at the second location of the client device.

9. The computer program product of claim 8, wherein the instructions cause the one or more processors to perform operations comprising:

receiving, through the user interface displaying the obscured representation of the first credential, an user input to provide further information; and in response to receiving the user input, displaying, on the user interface, a notification that provides information descriptive of the first region where the first credential is enabled for validation.

10. The computer program product of claim 1, wherein the instructions cause the one or more processors to perform operations comprising:

revoking the first credential based on determining that the second location of the client device is associated with the second region where the first credential is not enabled for validation, wherein revoking the first credential comprises disabling the first credential from future validation.

11. The computer program product of claim 1, wherein the instructions cause the one or more processors to perform operations comprising:

receiving, through the user interface, a new trigger to output a new representation of the first credential in a manner that enables a credential authority to validate the representation of the first credential;

in response to receiving the new trigger, identifying a time at the client device;

based on the time at the client device, determining, by the application, whether the time at the client device is within a predefined time period during which the first credential is enabled for validation; and in response to determining that the time at the client device is outside the predefined time period during which the first credential is enabled for validation, presenting, on the user interface, information indicating that the first credential is restricted.

12. The computer program product of claim 1, wherein the instructions cause the one or more processors to perform operations comprising:

receiving, through the user interface, a user input to output a representation of a second credential in a manner that enables a credential authority to validate the representation of the second credential;

in response to receiving the user input, identifying an updated third location of the client device;

based on the updated third location of the client device, determining, by the application, whether the updated third location of the client device is associated with a region where the second credential is enabled for validation; and in response to determining that the updated third location of the client device is not associated with the region where the second credential is enabled for validation, presenting, on the user interface, information indicating that the second credential is not enabled for validation at the updated third location of the client device.

13. The computer program product of claim 1, wherein the instructions cause the one or more processors to perform operations comprising:
   receiving, through the user interface, a user input to output a representation of a second credential in a manner that enables a credential authority to validate the representation of the second credential;
   in response to receiving the user input, identifying a time at the client device;
   based on the time at the client device, determining, by the application, whether the time at the client device is within a predefined time period during which the second credential is enabled for validation; and
   in response to determining that the time at the client device is outside the predefined time period during which the second credential is enabled for validation, presenting, on the user interface, information indicating that the second credential is restricted.

14. The computer program product of claim 13, wherein presenting the information indicating that the second credential is restricted comprises:
   displaying, on the user interface, a notification that provides information descriptive of the predefined time period during which the second credential is enabled for validation.

15. The computer program product of claim 1, wherein presenting the user interface on the display coupled to the client device comprises:
   presenting information about a group of credentials that are associated with a user account that is logged into the application executed on the client device.

16. The computer program product of claim 1, wherein receiving the first trigger comprises:
   receiving, through the user interface, a first user input to output a representation of the first credential in a manner that enables a credential authority to validate the representation.

17. The computer program product of claim 1, wherein the second region corresponds to a region outside the first region, and wherein determining that the second location is associated with the second region where the first credential is not enabled for validation comprises:
   determining, by the application, that the second location of the client device is not associated with the first region where the first credential is enabled for validation.

18. A system comprising:
   a client device, storing instructions for execution by a processor coupled to the client device, wherein the instructions, when executed, are operable to cause the processor to perform operations comprising:
   presenting, by an application executed on the client device and on a display coupled to the client device, a user interface that receives input related to outputting credential information, wherein the application is configured to manage credentials that are associated with a validation system;
   receiving a first trigger to provide a representation of a first credential;
   in response to receiving the first trigger, identifying a first location of the client device;
   based on identifying the location of the client device, determining, by the application, that the first location of the client device is associated with a first region where the first credential is enabled for validation;
   in response to determining that the first location of the client device is associated with the first region where the first credential is enabled for validation, displaying, on the user interface, the representation of the first credential;
   receiving a second trigger to update the representation of the first credential;
   in response to receiving the second trigger, identifying an updated second location of the client device;
   based on identifying the second location of the client device, determining, by the application, that the second location is associated with a second region where the first credential is not enabled for validation; and
   in response to determining that the second location is associated with the second region where the first credential is not enabled for validation, presenting, on the user interface, information indicating that the first credential is not enabled for validation at the second location of the client device.

19. The system of claim 18, wherein determining that the first location of the client device is associated with the first region where the first credential is enabled for validation comprises:
   transmitting, by the application and over a network connection through the client device, information corresponding to the first location of the client device to a remote server associated with the validation system;
   receiving, at the application and over the network connection through the client device, information from the remote server indicating the first region where the first credential is enabled for validation; and
   determining, by the application, whether the first location of the client device is within the first region indicated by the information received from the remote server.

20. The system of claim 18, wherein determining that the first location of the client device is associated with the first region where the first credential is enabled for validation comprises:
   accessing, by the application, information that defines the first region and that is stored at the client device; and
   determining, by the application, whether the first location of the client device is within the first region based on the information that defines the first region and that is stored at the client device.

21. The system of claim 18, wherein receiving the second trigger to update the representation of the first credential comprises:
   starting, by the application, a counter based on displaying the representation of the first credential on the user interface; and
   based on the counter reaching a particular value, identifying the updated second location of the client device.

22. The computer program product of claim 16, wherein receiving the second trigger comprises:
   receiving, through the user interface, a second user input to output a new representation of the first credential in a manner that enables the credential authority to validate the new representation of the first credential.

* * * * *